United States Patent [19]

George et al.

[11] Patent Number: 4,965,718

[45] Date of Patent: Oct. 23, 1990

[54] DATA PROCESSING SYSTEM INCORPORATING A MEMORY RESIDENT DIRECTIVE FOR SYNCHRONIZING MULTIPLE TASKS AMONG PLURALITY OF PROCESSING ELEMENTS BY MONITORING ALTERNATION OF SEMAPHORE DATA

[75] Inventors: David A. George, Somers; Bharat D. Rathi, Mahopac, both of N.Y.

[73] Assignee: International Business Machines Corporation, Armonk, N.Y.

[21] Appl. No.: 250,673

[22] Filed: Sep. 29, 1988

[51] Int. Cl.[5] .......................... G06F 9/46; G06F 11/30

[52] U.S. Cl. .................................. 364/200; 364/264.1; 364/264.5; 364/271.3; 364/281.3

[58] Field of Search ... 364/200 MS File, 900 MS File, 364/300

[56] References Cited

U.S. PATENT DOCUMENTS

| | | | |
|---|---|---|---|
| 3,879,711 | 4/1975 | Boaron | 364/200 |
| 4,118,789 | 10/1978 | Casto et al. | 364/900 |
| 4,320,451 | 3/1982 | Bachman et al. | 364/200 |
| 4,456,952 | 6/1984 | Mohrman et al. | 364/200 |
| 4,482,956 | 11/1984 | Tallman | 364/300 |
| 4,488,220 | 12/1984 | Friedli et al. | 364/200 |
| 4,500,959 | 2/1985 | Kubo et al. | 364/200 |
| 4,574,350 | 3/1986 | Starr | 364/200 |
| 4,584,640 | 4/1986 | MacGregor et al. | 364/200 |
| 4,604,694 | 8/1986 | Hough | 364/200 |
| 4,635,189 | 1/1987 | Kendall | 364/200 |
| 4,642,760 | 2/1987 | Yanai et al. | 364/200 |
| 4,745,541 | 5/1988 | Vaniglia et al. | 364/141 |

OTHER PUBLICATIONS

"An Introduction to Processing Systems", H. M. Deitel, Addison Wesley Publishing Company, Inc., 1984, pp. 55-71.

"Software Engineering with Ada", G. Booch, Benjamin/Cummings Publishing Co., 1983, pp. 231-235.

IEEE Porceedings of the 1985 International Conference on Parallel Processing, pp. 772-781, "A Methodology for Predicting Multiprocessor Performance", by A. Norton et al.

IEEE Proceedings of the 1985 International Conference on Parallel Processing, pp. 764-771, "The Research Parallel Processor Prototype (RP3): Introduction and Architecture", by G. F. Pfister et al.

IEEE Proceedings of the 1985 International Conference on Parallel Processing, pp. 790-797, "'Hot Spot' Contention and Combining in Multistage Interconnection Networks", by G. F. Pfister et al.

IEEE Proceedings of the 1986 International Conference on Parallel Processing, pp. 28-34, "The Onset of Hot Spot Contention", by M. Kumar et al.

IEEE Proceedings of the 1985 International Conference on Parallel Processing, pp. 782-789, "RP3 Processing-Memory Element", by W. C. Brantley et al.

"Computer Architecture and Parallel Processing", by Hwang and Griggs, McGraw-Hill, Inc., 1984, pp. 375-380.

*Primary Examiner*—Thomas C. Lee
*Attorney, Agent, or Firm*—Jeffrey L. Brandt

[57] ABSTRACT

In a data processing system of the type including a plurality of processing elements interconnected with each other and with a plurality of memory elements by an interconnection means, a method is provided for accommodating the accessing of a selected memory location in a selected one of the memory elements by at least one requesting processing element to read data stored thereat. The method thereby permits the communication of information between the plurality of processing elements. The method comprising the steps of: sending, from the requesting processing element to the selected memory element via the interconnecting means, a directive including (1) the address of the selected memory location, (2) a comparison value, and (3) an identification of the requesting processing element sending the directive; reading in the selected memory element the data stored at the selected memory location; comparing in the memory element the read data with the comparison value; notifying the requesting processing element via the interconnection means if the read data matches the comparison value; storing the directive in the selected memory element if the read data does not match the comparison value; and repeating the reading, comparing, and notifying steps each time the data in the selected memory location is altered.

24 Claims, 8 Drawing Sheets

(PROCESSING ELEMENT)

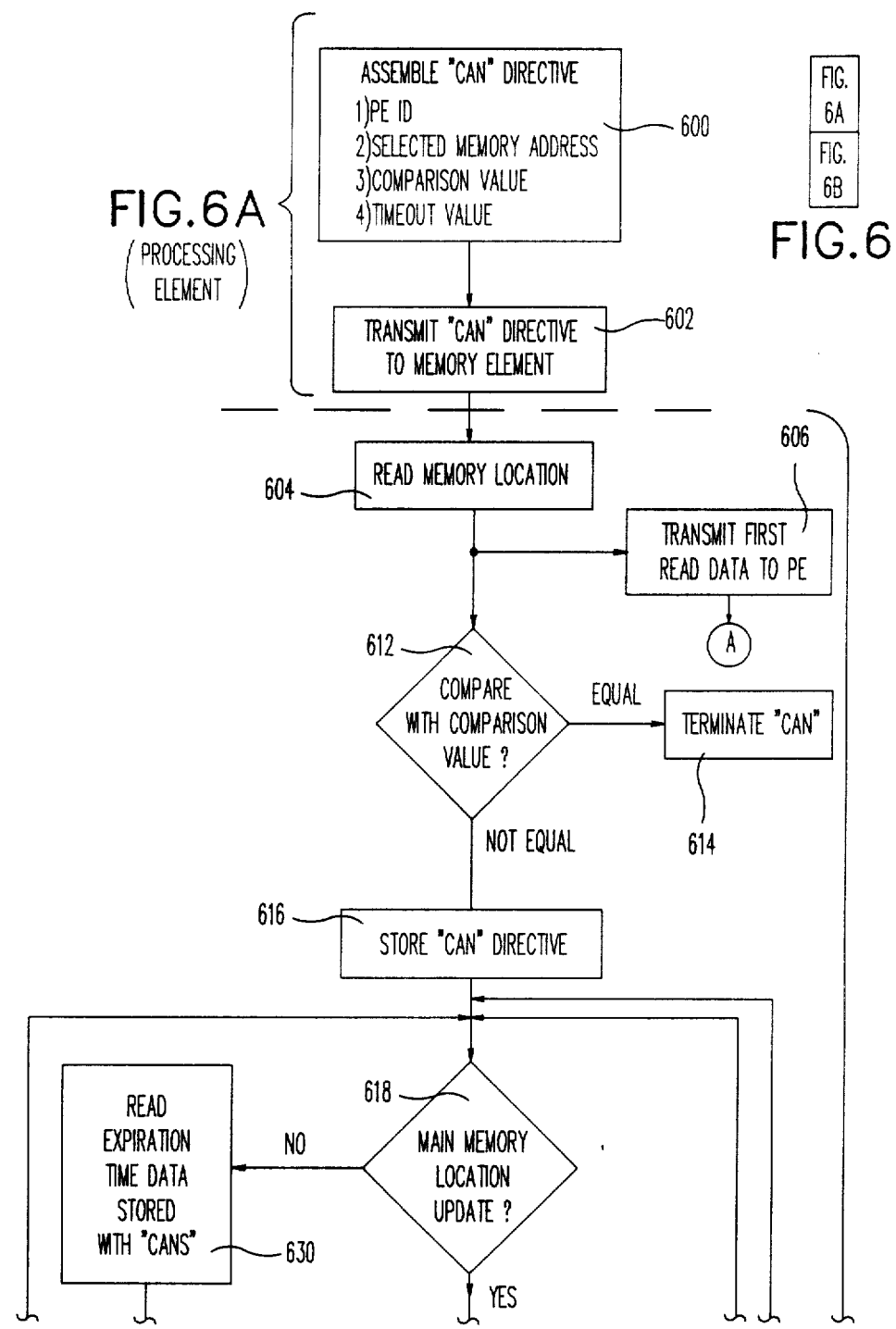

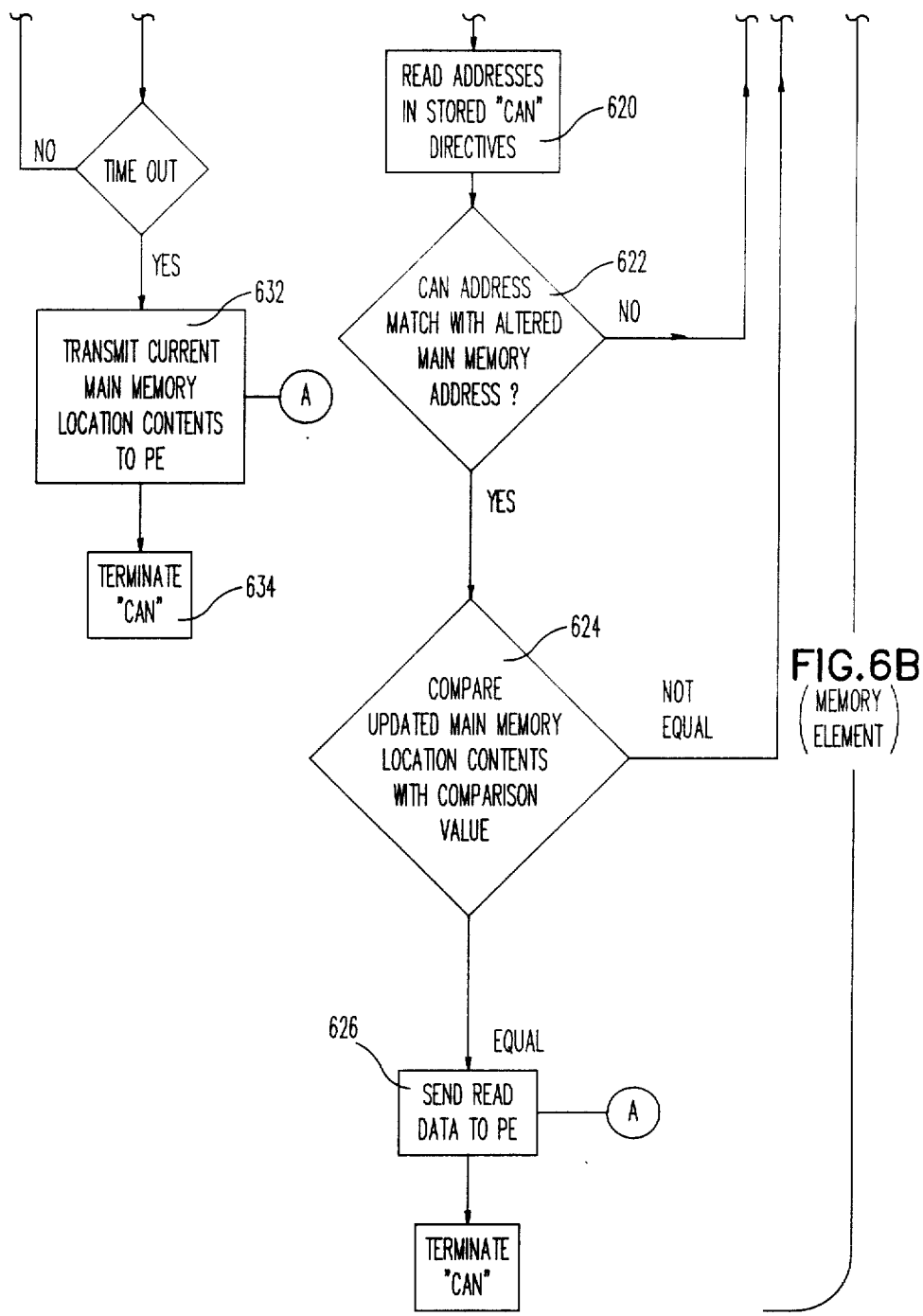

DATA PROCESSING SYSTEM INCORPORATING A MEMORY RESIDENT DIRECTIVE FOR SYNCHRONIZING MULTIPLE TASKS AMONG PLURALITY OF PROCESSING ELEMENTS BY MONITORING ALTERNATION OF SEMAPHORE DATA

The present invention relates generally to data processing and more particularly to a method and apparatus for communicating data between multiple tasks through the use of a memory directive operative to monitor the status of a semaphore stored at a memory location provided by the requesting task. Once initiated, the directive executes repeatedly without the intervention of the requesting task. The invention is applicable to both uniprocessor and multiprocessor systems executing multiple tasks.

BACKGROUND OF THE INVENTION

In the past several decades, significant advances have been made in the direction of increasing the density and speed of basic electronic elements such as transistors. In accordance with these gains, similar advances have been made in the speed and hence computing power of electronic microprocessors, such as the Intel model 80386 microprocessor. In fact, these achievements have been so substantial that in many circumstances the speed and density limitations now being encountered in semiconductor devices are basic physical limitations, such as the speed with which electrons can propagate through an electrical conductor. Further improvements along these lines will thus involve significant advances in the state of the art, achievable only at similarly significant expense.

One area of computing which is not, however, subject to the physical limitations described above, and hence which is ripe for further improvements in speed and power, is that of increasing the efficiency of use of processing systems.

One type of computing system particularly ripe for improvements in processing efficiency is that known in the art as parallel processing. In a parallel processing system, multiple microprocessors of the type described above are connected in electronic configurations which permit them to perform separate computing tasks, each task divided out of a larger application program, or parent. Tasks can comprise two types, parent tasks and child tasks, the former including control and synchronization information for the latter.

In a true parallel processing system, each of the multiple processors has access to shared common memory, has access to at least a portion of the system input/output (I/O), and is controlled by a single operating system providing interaction between the processors and the programs they are executing. Theoretically, then, it is possible to divide a large program between N parallel tasks, each task running in a separate processor, and complete the program a factor of N times faster than any single processor could complete the job alone.

Many different system configurations are known for connecting the multiple processors, and related system memory and I/O elements, to function in the manner described above. These configurations include time-share bus configurations wherein the system elements are interconnected via a time-shared data link, crossbar configurations wherein the system elements are connected via an arrangement of matrix switches, and multiple-bus/multiport systems wherein processing and I/O elements are connected to multiple memory ports via multiple buses. Each system configuration has associated with it different advantages and disadvantages, many of which are still under investigation and open to debate between those skilled in the art. For a general discussion of multiprocessor performance, the reader is directed to an article in the IEEE PROCEEDINGS OF THE 1985 INTERNATIONAL CONFERENCE ON PARALLEL PROCESSING, pgs. 772-781, "A Methodology for Predicting Multiprocessor Performance", by A. Norton, et al. For a more thorough description of one particular type of parallel processing system, the reader is directed to an article in the IEEE PROCEEDINGS OF THE 1985 INTERNATIONAL CONFERENCE ON PARALLEL PROCESSING, pages 764-771, "The IBM Research Parallel Processor Prototype (RP3): Introduction and Architecture", by G.F. Pfister, et al. References to the IBM RP3 parallel processor will be made throughout this document for the purpose of exemplifying features typically found in parallel processing systems. It is to be understood that the invention set out below is in no way limited by the constructs of the RP3 system.

One problem area common to each of the different types of parallel processing configurations is that of resource allocation and management. That is, once the program has been parsed into tasks amenable to parallel processing, the separate tasks must be scheduled, a selected processor assigned to each, and the system memory and I/O resources allocated so as to efficiently utilize the parallel processing capabilities. If this resource allocation and management is not well handled, much of the above-described theoretical efficiency of parallel processing is lost.

In prior art parallel processing systems, two general methods are provided for utilizing shared resources. The first method, processor signaling, involves the use of primitives initiated within each processor to notify one or more other processors of event occurrences. For the purposes of this document, a primitive is defined as a non-decouplable operation, or an operation in the execution of which no other operation can overlap. Sample primitives include, of course, adds and subtracts in the processing element hardware, and fetches and stores in the memory hardware.

Processor signaling requires a substantial amount of sophisticated software programming, and is perfectly adequate for course grain parallelism such as the FORKs and JOINs used to divide and subsequently re-join large tasks within parallel processed programs. As the parallelism becomes increasingly fine, however, (i.e. as more and smaller tasks in the program are divided out for parallel processing), the overhead associated with processor signalling becomes unacceptably large, decreasing the efficiency of the parallel processing to an unacceptable extent.

A second method of utilizing shared resources is that of using memory semaphores, i.e. indivisable modification of memory content to signal the availability or unavailability of a particular resource. This second method is alternately referred to as the use of "lockouts", "shoulder tapping", or "mailboxing", each referring to the use of a particular message or code placed in a particular memory location to notify other processors of the status of a resource. In systems employing such memory semaphores, a processor which is waiting on the availability of a particular resource must read the memory location containing the code relating to the status of that resource, and continue its operation accordingly. If the memory semaphore indicates the resource is unavailable, then, in prior art systems, the inquiring microprocessor enters a wait state wherein processing is halted, this wait state being punctuated by periodic re-readings of the memory semaphore. This status of repeated waits and reads is known in the art as a "spin loop".

Memory semaphores are perfectly acceptable for the coarse grain parallelism described above. However, as the parallelism becomes increasingly fine, and more tasks are running concurrently, the number of these spin loops increases significantly. As the number of the spin loops increases, the system hardware providing the interconnection between the processors and memory, i.e. the bus, switching matrix, etc. as described above, encounters regions of interferences caused by conflicting memory accesses. This problem can result in "hot spots", or portions of the processor interconnection hardware which become too overloaded with these conflicting memory accesses to continue supporting the processing. The system thus experiences highly inefficient, unacceptable delays.

One already known method of diminishing the undesirable formation of these hot spots is that of combining multiple fetch or read requests for a single memory location. According to this method, the responsibility for notifying all of the processors waiting on the particular memory location is assigned to a single processor. This method, while functioning to some extent to relieve hot spots, is subject to several disadvantages. First, the efficiency of such combination is dependant on the lucky collisions or overlapping of requests for the same memory location. Such schemes require additional code and storage resources to manipulate the lists. The cost in hardware of building the interconnect networks required to support such combining is very high. Further, if the single processor having the notification responsibility should fail, continued operation of the system may be seriously spots in general, the reader is directed to an article in the IEEE PROCEEDINGS OF THE 1986 INTERNATIONAL CONFERENCE ON PARALLEL PROCESSING, pgs. 28-34, "The Onset of Hot Spot Contention", by M. Kumar, et al. For a discussion of hot spots and combining, the reader is directed to an article in the IEEE PROCEEDINGS OF THE 1985 INTERNATIONAL CONFERENCE ON PARALLEL PROCESSING, pgs. 790-797, "'Hot Spot' Contention and Combining in Multistage Interconnection Networks", by G.F. Pfister, et al.

The following patents are of interest as showing processing systems having some degree of redundancy or automatic error detection to prevent processing system failures. They do not address the problems of parallel processing systems recognized by the present invention.

U.S. Pat. No. 4,456,952 to Mohrman et al. shows a data processing system having redundant control processors for fault detection. Comparators are provided for comparing the operation of the dual processors. Fault processing circuitry is provided for detecting errors between the two processors and identifying which of the processors is not operating properly.

U.S. Pat. No. 4,500,959 to Kubo et al. shows a computing system including a main memory and an directive buffer. An inconsistency arises when an directive in the main memory is changed after that same directive is stored in the directive buffer. The system operates to identify such inconsistencies, and to invalidate the contents of the directive buffer when the changed directive is to be executed.

U.S. Pat. No. 4,118,789 to Casto et al. shows a programmable controller having a control program with a protected portion. Each time the control program is run, the protected portion is compared against a corresponding program stored in a ROM. If the protected portion of the control program does not correspond with the ROM-stored program, an error signal is generated and execution is prevented.

U.S. Pat. No. 3,879,711 to Boaron shows a digital data processing system including a data processing unit, a central memory unit, and a control unit. A sentinel memory is provided for receiving a programmed directive. A comparator is provided for comparing the contents of the directives register of the central memory unit with the contents of the sentinel memory. The comparator provides a control signal to the control unit when the contents are identical.

While the formation of hot spots as described above is a problem peculiar to parallel processing systems, it will be appreciated that systems employing single processors, i.e. uniprocessor systems, also suffer from problems associated with the synchronizing of multiple tasks. In uniprocessor systems, large, complex programs are typically broken down for execution into smaller, separately executable tasks analogous to the child tasks described above. The operating system is then responsible for synchronizing the execution of the various tasks. Such synchronization might include, for example, that necessary to temporarily block a task pending the completion of a data I/O operation, and subsequently awaken the task when the operation is complete.

Synchronizing multiple tasks in a uniprocessor system typically requires the extensive use of a "polling" operation, whereby the operating system reads semaphores of the type described above to check the status of various tasks. The results of this polling can then be used to change the status of tasks, as appropriate. This polling, however, requires a substantial quantity of system resources, particularly of processing time. As the number of tasks requiring synchronization increases, the polling increases accordingly. Eventually, a substantial quantity of processing time becomes tied up in task synchronization, detrimentally affecting the system resources available for actual processing. For a discussion of task states, the reader is directed to "An Introduction to Processing Systems", by H.M. Deitel, Addison-Wesley Publishing Company, Inc., 1984, pgs. 63-72. For a further discussion of synchronizing tasks in uniprocessor and multiprocessor environments, the reader is directed to "Software Engineering with Ada", by G. Booch, Benjamin/Cummings Publishing Co., 1983, pgs. 231-235.

SUMMARY OF THE INVENTION

The principal object of the present invention is to provide a new and improved method and apparatus for communicating data between multiple tasks in data processing systems.

Another object of the present invention is to provide such a method and apparatus through the use of semaphores in selected memory locations.

A further object of the present invention is to provide such a method and apparatus for communicating data between multiple tasks in a uniprocessor processing system.

Yet another object of the present invention is to provide such a method and apparatus for communicating data between multiple tasks in a multiple processing system.

A more specific object of the present invention is to provide a method and apparatus for communicating data between multiple tasks in a processing system through the use of a directive operative in a memory element to monitor the status of a semaphore.

In accordance with a first embodiment of the present invention, there is provided, in a data processing system including a plurality of processing elements interconnected with each other and with at least one memory element by an interconnection means, each of the processing elements selectively executing program tasks, the at least one memory element including multiple memory locations identifiable by corresponding memory addresses for storing data, a method for synchronizing operation of the plurality of processing elements, the method comprising the steps of: designating a selected memory location of a selected memory element to contain semaphore data; altering, by selected ones of the plurality of processing elements, the semaphore data whereby to indicate a status of selected tasks; sending, from at least one requesting processing element to the selected memory element via the interconnecting means, a directive including (1) the address of the selected memory location, and (2) an identification of the requesting processing element sending the directive; reading in the selected memory element the semaphore data; sending the semaphore data to the requesting processing element via the interconnection means; storing the directive in the memory element; monitoring in the memory element the alteration of the semaphore data; and repeating the reading and sending steps when the semaphore data is altered.

In accordance with another embodiment of the present invention, there is provided, in a data processing system including a plurality of processing elements interconnected with each other and with at least one memory element by an interconnection means, each of the processing elements selectively executing program tasks, the at least one memory element including multiple memory locations identifiable by corresponding memory addresses for storing data, apparatus for synchronizing operation of the plurality of processing elements, comprising: means for designating a selected memory location of a selected memory element to contain semaphore data; means for altering, by selected ones of the plurality of processing elements, the semaphore data whereby to indicate a status of selected tasks; means for sending, from at least one requesting processing element to the selected memory element via the interconnecting means, a directive including (1) the address of the selected memory location, and (2) an identification of the requesting processing element sending the directive; means for reading in the selected memory element the semaphore data; means for sending the semaphore data to the requesting processing element via the interconnection means; means for storing the directive in the memory element; means for monitoring in the memory element the alteration of the semaphore data; and means for repeating the reading and sending steps when the semaphore data is altered.

BRIEF DESCRIPTION OF THE DRAWINGS

These and other objects, features, and advantages of the present invention will become apparent to those skilled in the art upon a consideration of the detailed description of the invention set out below when read in conjunction with the drawing Figures, in which.

DETAILED DESCRIPTION OF THE INVENTION

The present invention will be described first with reference to a multiprocessing system, and subsequently with reference to a uniprocessor processing system.

Figure 1:
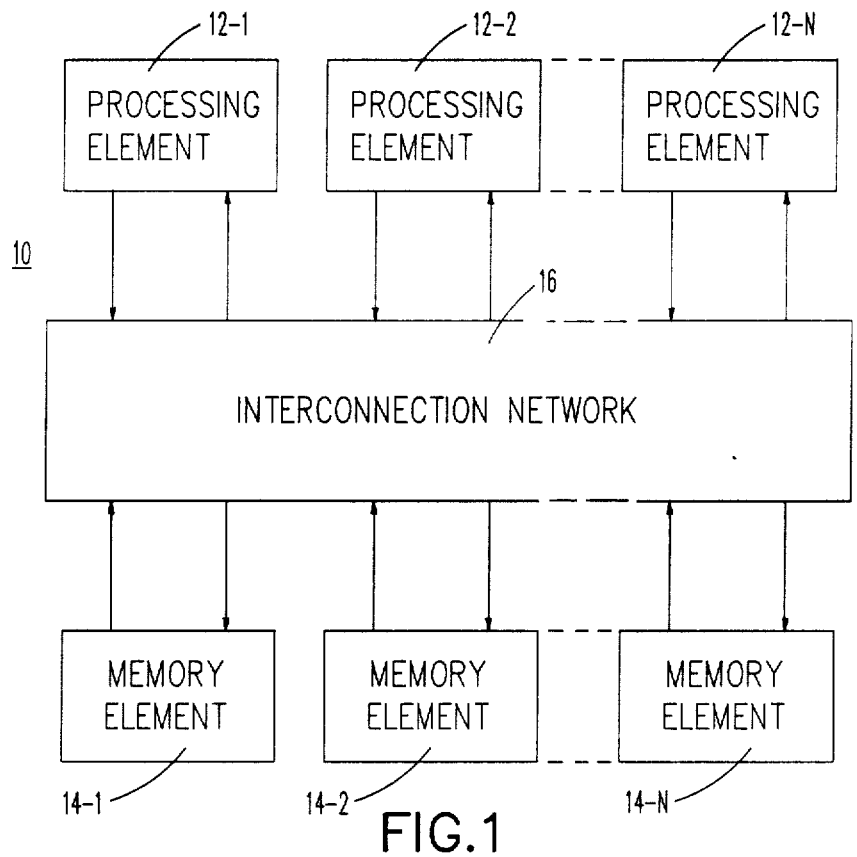
FIG. 1 is a block diagram showing a parallel processing system constructed in accordance with the present invention.

Referring now to FIG. 1, a simplified block diagram of a multiprocessor system 10 is shown including a plurality N of processing elements (PE), indicated at 12-1 through 12-N, connected to a plurality M of memory elements (ME), indicated at 14-1 through 14M through an interconnection network 16. Processing elements 12 and memory elements 14 are interconnected by network 16 so as to permit duplex data communication therebetween. As discussed in further detail below, system 10 is structured to accommodate parallel processing of tasks amongst processing elements 12, the processing elements having access to shared data distributed between memory elements 14, and the various tasks being under the control of a single operating system (not shown). A variety of operating systems supporting such parallel processing are known to those skilled in the art, and the details of any one particular operating system are not necessary to an understanding of the present invention.

Figure 2:
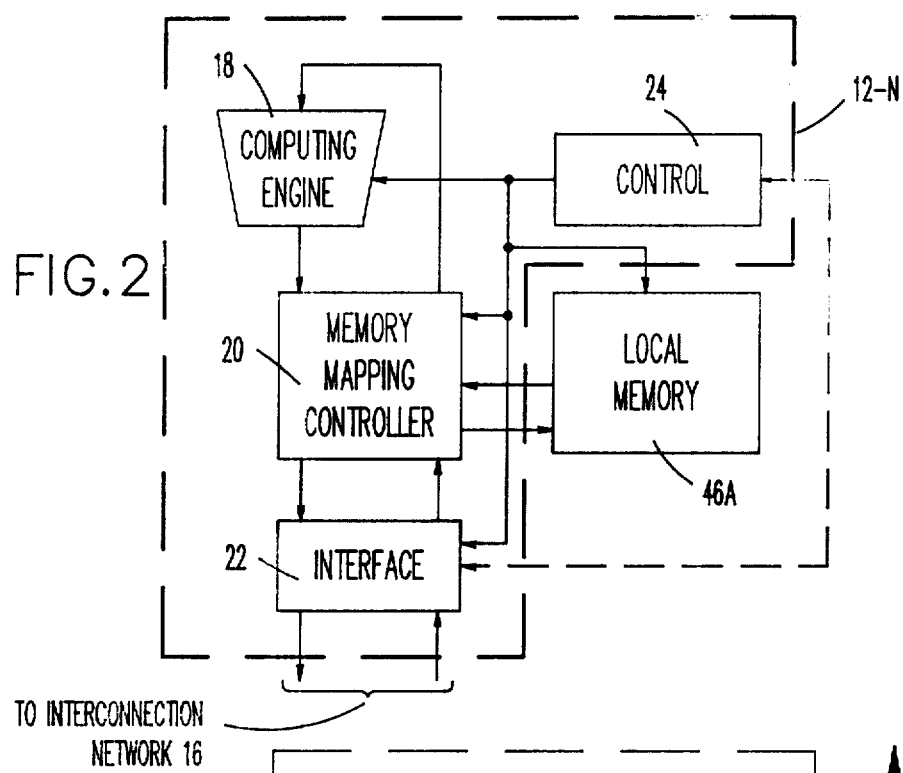
FIG. 2 is a schematic diagram of a processing element from FIG. 1.

Referring now to FIG. 2, the features of one exemplary processing element 12-N are shown in greater detail. Processing element 12-N includes a computing engine 18, preferably including an arithmetic logic unit (ALU) and a floating point processor (FPP), conventional features well known to those skilled in the art. A memory mapping controller 20 is connected to computing engine 18 for mapping the memory addresses generated by the computing engine to memory elements 14 (FIG. 1) including a local memory space 46A designated for the exclusive use of each processing element 12 (but not necessarily located with the processing element hardware). An interface 22 is connected to memory mapping controller 20 for providing a logical interface with interconnection network 16. A controller 24 is associated with each processing element 12 for controlling the operation of the various components therein. It will be understood that, while the interconnections between the various elements may be indicated with single lines, the drawings are intended to show logical connections, and the actual signal lines may comprise buses of multiple conductors supporting multiple, parallel signals.

In the operation of processing element 12, control logic 24 functions to control computing engine 18 in accordance with directives stored in memory including local memory 46A. Memory mapping controller 20 functions to convert memory addresses generated by computing engine 18 to accommodate various memory paging and interleaving schemes as discussed in further detail below. Interface 22 provides a logical interface for exchanging digital data between memory mapping controller 20 and interconnection network 16.

The processing element 12 shown in FIG. 2 is intended to represent, for the purposes of describing the present invention, a generic type of processing element. Many specific types of processing elements, for example the Intel model 80386, are well known to those skilled in the art. For a description of the processing element utilized in the IBM RP3 parallel processing system described in the documents referenced hereinabove, the reader is referred to an article in the IEEE PROCEEDINGS OF THE 1985 INTERNATIONAL CONFERENCE ON PARALLEL PROCESSING, pgs. 782-789, "RP3 Processor-Memory Element", by W.C. Brantley et al.

Figure 3:
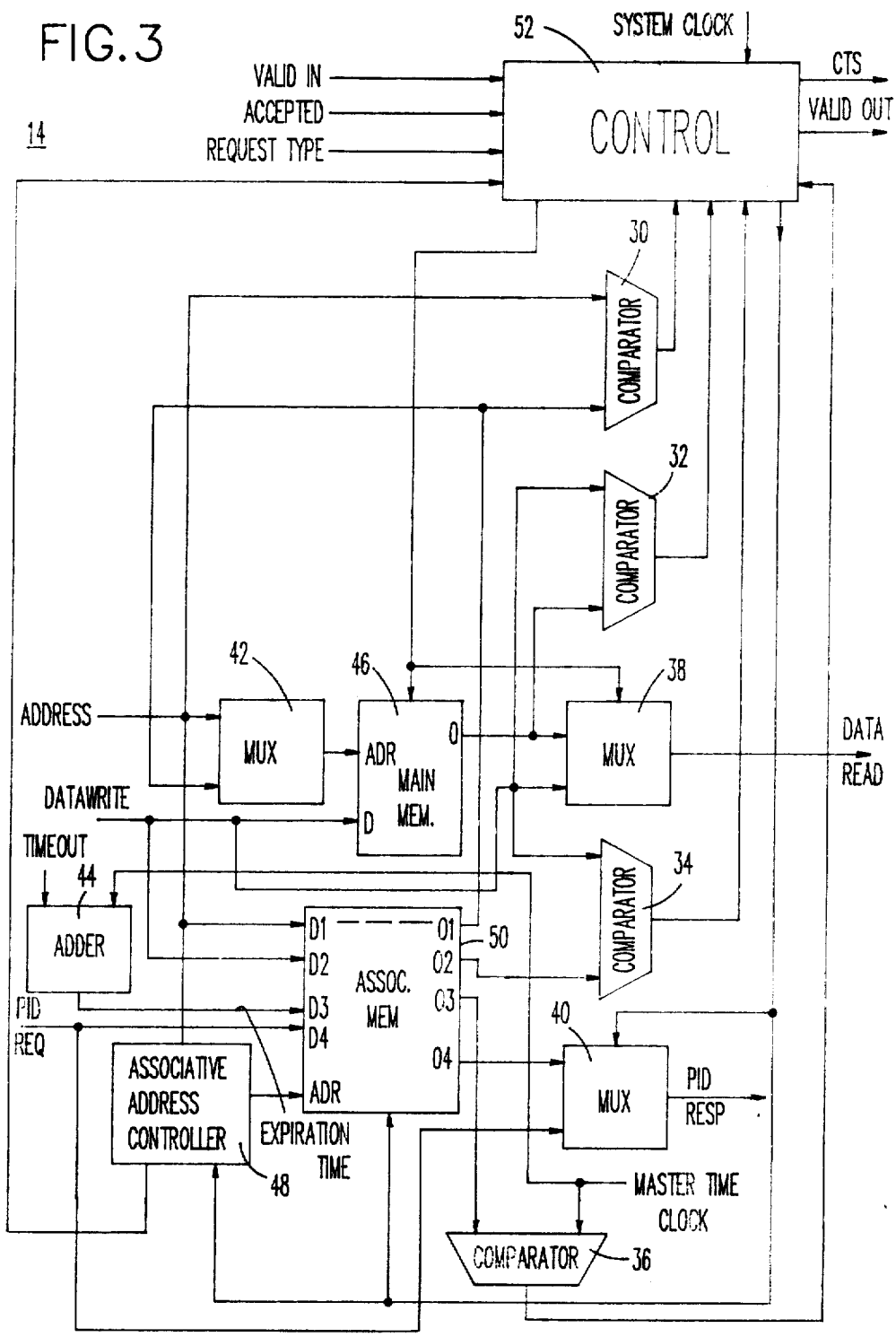
FIG. 3 is a schematic diagram of a memory element from FIG. 1.

Referring now to FIG. 3, a memory element 14 is shown constructed in accordance with the present invention. Memory element 14 includes four digital data comparators indicated at 30, 32, 34, 36, three time domain multiplexers (mux) indicated at 38, 40, 42, a digital adder 44, a main memory 46 comprised of dynamic random access memory (DRAM) chips, and an associative memory system including an associative address controller 48 and an associative memory 50 also comprised of DRAMS. It will be appreciated by those skilled in the art that all of the above-described components are conventional in the digital signal processing field. Information on the construction and operation of associative memories can be found, if desired, in the book: "Computer Architecture and Parallel Processing", by Hwang and Briggs, McGraw-Hill, Inc., 1984, pgs. 375-380. Further included with memory element 14 is control logic 52 for controlling the operation of the memory element in a manner described in detail hereinbelow.

Continuing to describe the construction of memory element 14, main memory 46 has its address input connected to the output of mux 42. Memory 14 has its data input connected to a DATA_WRITE signal line in parallel with an input to mux 38, an input to comparator 34, a data input D2 to associative memory 50 and an input to comparator 32. The DATA_WRITE signal includes the data, for example an 8-bit byte, to be written into memory 14. Main memory 46 has its data output connected in parallel to an input of mux 38 and an input of comparator 32. Mux 42 has its first input connected to an ADDRESS signal line in parallel with an input to comparator 30, a data input D1 to memory 50, and an input to associative address controller 48. The ADDRESS signal includes the address for the memory location to be accessed in memory 46. MUX 42 has its second input connected to an output 01 of memory 50 in parallel with an input to comparator 30.

Associative memory 50 has its address input connected to an output of associative address controller 48, and a data input D3 connected to the output of adder 44. A data input D4 of associative memory 50 is connected to a requesting processor identification PID_REQ signal line in parallel with an input to mux 40, the second input to the mux being connected to associative memory output 04. The PID_REQ signal includes the identification of a requesting processing particular task performed by that processing element. Output 03 of associative memory 50 is connected to an input to comparator 36, and output 02 of the memory is connected to an input of comparator 34. Comparator 36 includes a second input connected to a MASTER_TIME_CLOCK signal in parallel with an input to adder 44, the second input to the adder being connected to a TIMEOUT signal line. The MASTER_TIME CLOCK signal is a real time counter distributed throughout system 10 by a clock bus (not shown). The TIMEOUT signal, provided by the tasking processing element 12, provides the time during which memory element 14 is to repeatedly execute the compare and notify (CAN) directive described below.

Control logic 52 receives three control signals generated externally to memory element 14 by processing elements 12: a VALID_IN signal indicating that incoming address and data signals are valid, a REQUEST_TYPE signal indicating the type of memory access desired (i.e. READ, LOAD, etc.), and an ACCEPTED signal indicating that data transmitted from memory element 14 to a processing element has been accepted. Including the ADDRESS, DATAWRITE, TIMEOUT, and PID_REQ signals, memory element 14 receives seven signals from processing element 12.

Control logic 52 generates two control signals for transmission to processing elements 12 external to memory element 14: a clear to send CTS signal, indicating that the memory is free to accept a request, and a VALID_OUT signal indicating that valid data is being transmitted at the outputs of muxs 38 and 40. Including the DATAREAD signal at the output of mux 38, and the PID_RESP signal at the output of mux 40, memory element 14 thus generates four signals for transmission to processing element 12. Control 52 further receives a system clock pulse SYSTEM CLOCK.

Internal to memory element 14, control logic 52 is connected to receive five signals: the output signals from comparators 30, 32, 34, and 36, and data (described below) from associative address controller 48. Control logic 52 is connected to transmit control signals to the following units within memory element 14: mux 40, memory 50, associative address controller 48, main memory 46, and mux 38.

Figure 4:
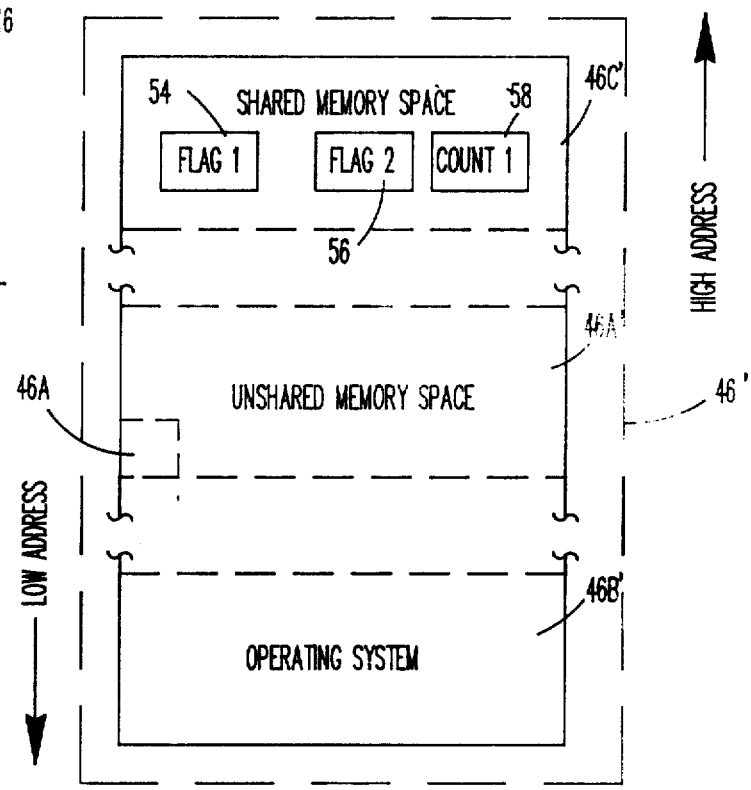
FIG. 4 is a block diagram showing the allocation of memory locations within the memory element of FIG. 3.

Referring now to FIG. 4, a simple schematic diagram is used to illustrate a preferred method of relegating the memory space within a main memory 46'. For the purposes of FIG. 4, it will be understood that main memory 46' includes the entirety of the main memory distributed across memory elements 14, i.e. the total memory space provided by the sum of main memories 46 in each of the M memory elements 14. The lower addresses of memory 46', indicated at 46B, are generally designated for the operating system kernel. A high address memory space, indicated generally at 46C, is designated as shared memory space accessible by any of processors 12, and may contain, for example, semaphores (or flags) 54, 56, and shared data such as the count shown at 58. Between higher address shared memory space 46C and lower address memory space 46B occupied by the operating system, a memory space 46A (see also FIG. 2) is designated as unshared (or private) memory associated with a specific processing element 12. It will be understood that these regions 46A, 46B, 46C of the memory are not fixed in size, and needn't be contiguous in nature. They represent one preferred method of allocating the memory resources within the parallel processing system of the present invention.

While the memory elements 14 have been shown as M discrete elements each supporting DRAM memory 46, it will be understood that in an actual implementation the memory can comprise one or more elements, and is typically paged and interleaved in accordance with many such schemes well known to those skilled in the art. Memory mapping controller 20 of processing element 12 functions to convert the address generated by computing engine 18 in accordance with the selected paging and/or interleaving scheme. For a more thorough discussion of memory addressing in parallel processing systems, the reader is directed to "Computer Architecture and Parallel Processing", by Hwang and Briggs, McGraw-Hill, Inc. 1984, pgs. 60–118. A detailed description of the operation of memory elements 14 in parallel processing system 10 is set out hereinbelow with reference to FIGS. 6–8.

Many of the elements shown in FIG. 3 are described below as located "in" the memory elements, and many of the functions performed by these elements are described as being performed "in" the memory elements. Referring function as "in" a memory element is defined to mean the elements and functions so described are located functionally outside of the interconnection network ports on the side of the memory elements. The use of the descriptor "in" is not intended to imply any necessary physical relationship such as board, chip, or cabinet location.

Referring again back to FIG. 1, the type of interconnection network 16 utilized in system 10 is not relevant to the understanding or practice of the present invention. Referring to the articles on "hot spots" referenced above, the reader will see that the problem addressed by the present invention arises in parallel processing systems regardless of the type of interconnection network used. Whether interconnection network 16 is selected to be a bus network, a matrix switching network, a multi-bus/multiport network, or some combination of the above, it must include a tree structure for interconnecting multiple sinks (i.e. processors, I/O devices, etc.) to every shared memory location. Hence, regardless of the type of interconnection network used, the present invention can be utilized to minimize the occurrence of hot spots resulting from memory access contentions. As an example of one particular type of interconnection network, the reader is directed to an article describing that used in the IBM RP3 parallel processor discussed above: IEEE PROCEEDINGS OF THE 1985 INTERNATIONAL CONFERENCE ON PARALLEL PROCESSING, pages 764–771, "The IBM Research Parallel Processor Prototype (RP3): Introduction and Architecture", by G.F. Pfister, et al.

Figure 5:
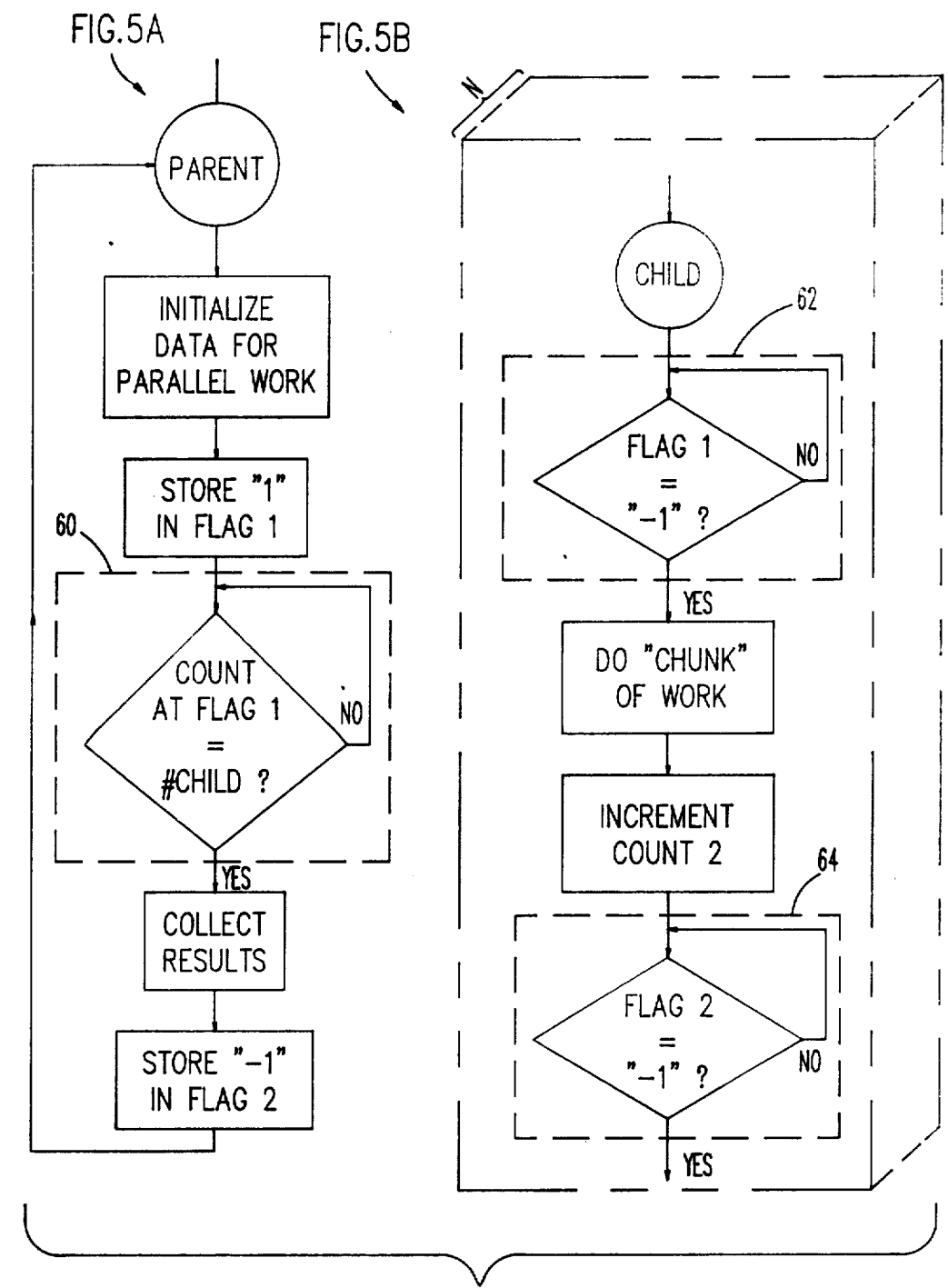
FIG. 5A, which includes FIGS. 5A and 5B, comprises flow charts showing a simplified example of parallel processes utilizing spin loops in accordance with the prior art.

Referring now to FIG. 5, including FIGS. 5A, 5B, a simple FORK/JOIN process is shown using spin loops in accordance with the prior art. It is to be understood that the present invention, and in particular the operation of memory element 14 of FIG. 3, substantially solves the hot spot problems by eliminating the spin loops shown in FIG. 5. The prior art operation is described at this point in the document only so that it may be clearly contrasted to the improved operation in accordance with the operation of the invention described immediately thereafter.

FIG. 5 shows a flow chart of a process including a parent task indicated at 5A, and N child tasks indicated at 5B, these parent and child tasks having been parsed by an operating system for parallel processing in multiple processing elements. The parent task 5A initializes the data required by the N child tasks 5B for parallel processing, and then signals the child tasks with a count of "−1" (a semaphore) stored in a shared memory location indicated as FLAG1. The parent task then enters a spin loop, indicated in dashed-line at 60, wherein it repeatedly fetches the count stored in FLAG1 to determine if all of the children have completed their processing, i.e. if the stored count equals the number N of child tasks. The parent task will remain in this spin loop, repeatedly fetching the count stored at the FLAG1 memory location until the value read indicates the child tasks are all completed. After the fetched value indicates that the child tasks are completed, the parent task will collect the results of the child tasks and store a "−1" count in a separate FLAG2 memory location to indicate to the child tasks that they are all complete, and the data is collected.

For their part, the N child tasks will initiate spin loops, indicated at 62, repeatedly fetching the contents at the FLAG1 memory location until they receive the "−1" count indicating that they can begin processing (i.e. that the necessary data is initialized). Each child will perform its task, or "chunk" of work, incrementing the count in FLAG1 upon its completion. Thereafter, each child will enter a second spin loop, indicated at 64, repeatedly fetching the count at FLAG2 until it indicates the process is complete and the data collected. Three spin loops, indicated at 60, 62, 64, are thus established from a simple FORK/JOIN operation of parallel processed parent/child tasks.

Continuing to describe the prior art of FIG. 5, each time a loop is executed in each of spin loops 60, 62, 64 a memory location FETCH is initiated at the requesting processing element and propagated through an interconnection network to the memory location. The FETCH is performed as a primitive in the particular memory element storing the flag address to be read, and the value read from the memory location is transmitted back across the interconnection network to the requesting processing element. As increasing numbers of tasks are performed in parallel, increasing memory semaphoring is required to coordinate the tasks. As the memory semaphoring increases, the number of spin loops increases. And, as described above and in the referenced articles, as the number of spin loops increases, the greater the contention and hence interference will be for accessing memory locations. In the operation shown in FIG. 5, for example, it is seen that at some point all of the N children will be in contention for reading the values stored at FLAG1 and FLAG2. This contention creates the above-described hot spots, greatly inhibiting the ability of the interconnection network to transmit data, and thus greatly diminishing the processing efficiency of a multiprocessor system. It is important to understand that the creation of these hot spots causes memory access contention not only at the memory locations being accessed in the spin loops, but, due to the tree structure inherent in all of the interconnection networks, interference exists when accessing any of the memory locations. Spin loops could thus be said to work in a synergistic manner to degrade system performance.

Figure 6C:
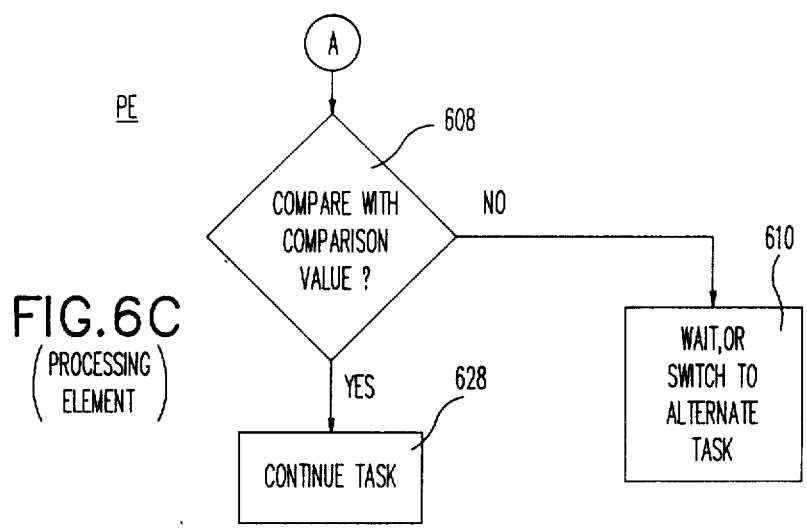
FIG. 6A, which includes FIGS. 6A, 6B, and 6C, comprises flow charts illustrating the execution of a Compare And Notify directive in accordance with the present invention.

The operation of the invention will now be described with reference to FIGS. 3, 6, the former showing the hardware implementation as described above and the latter illustrating the process flow in the manner described below. FIG. 6 has been subdivided into three separate parts, FIG. 6A indicating functions performed in the requesting processing element 12 to generate the CAN directive, FIG. 6B indicating functions performed in the memory element 14 to execute the directive as a primitive, and FIG. 6C indicating functions performed in the requesting processing element 12 during and after the execution of the CAN directive. As an overview, the operation generally consists of a Compare and Notify (CAN) directive assembled and initiated by a requesting or tasking one of the processing elements 12, and executed as a primitive in a memory element 14 (of the type shown in FIG. 3) containing a designated address. The operation will be described with respect to two different scenarios:(1) an immediately successful CAN, and (2) a stored and re-executed CAN.

SCENARIO 1: AN IMMEDIATELY SUCCESSFUL CAN

Referring now to FIGS. 3, and 6A, to initiate a CAN directive, a requesting processing element 12 first assembles, the directive, including four distinct data fields (step 600). The first field, a processing element and task identifier (PID_REQ), includes data identifying which of the processing elements 12 is requesting the CAN. If necessary to distinguish among multiple tasks performed in the requesting processing element 12, the first data field also includes a task identifier. The second data field is the address (ADDRESS) of the memory flag to be read, i.e. the selected memory location in the selected memory element 14. The third data field is the comparison value that the requesting microprocessor expects to find at the address of the memory flag. This third data field will arrive on the DATA_WRITE signal line of FIG. 3 when the directive is transmitted. The fourth data field is a timeout value (TIMEOUT) defining the duration of time over which the CAN directive is to be repeated in the memory element if it is not immediately successful.

Once the CAN directive is assembled, it is transmitted to memory element 14 (step 602) via an appropriate electronic "handshake" with control unit 52. To provide this electronic handshake, the requesting processing element 12 checks the clear to send CTS signal line to be sure the selected memory element 14 is free to receive a directive, and then sends an appropriate REQUEST TYPE signal identifying a CAN directive along with a VALID IN signal and the assembled CAN directive.

Referring now also to FIG. 6B, on the initial receipt of the CAN directive, the ADDRESS signal is gated through mux 42 and utilized by control logic 52 to read the selected location in main memory 46 (step 604). The processor/task identification PID_REQ is gated to the output of mux 40 (PID_RESP) and used to transmit this first data read from memory 14 back to the requesting processing element (step 606) on the DATA_READ signal line at the output of mux 38. Appropriate electronic handshaking is performed through the generating of a VALID OUT signal by the memory element, and a return of the ACCEPTED signal from the requesting processing element.

Referring now also to FIG. 6C, in the illustrated embodiment of the invention, a DATA_READ value, comprising the actual contents of the selected location in memory element 14, is always returned to the requesting microprocessing element 12, which must make its own comparison between the expected (i.e. comparison) value and the returned value to determine if a match has occurred. Accordingly, the requesting processing element compares the read value with the expected value (step 608 of FIG. 6C) and determines if they match and processing should continue. If no match is found, processing can wait or be switched to an alternate task (step 610 of FIG. 6C). It will be appreciated that, as an alternative to returning the contents of the memory location to the requesting processing element 12, the comparison with the comparison value can be done in memory element 14, and a compare/no compare signal returned to the requesting processing element 12.

Generally concurrent with the transmission of the DATA_READ signal back to the requesting processing element, the DATA_WRITE (comparison value) and DATA_READ (read value) signals are compared in comparator 32 (step 612). Assuming for the sake of this scenario that they match, a successful match is noted by control logic 52 and the CAN directive is terminated (step 614). This termination includes discarding the CAN directive so that it is not repeatedly executed in the manner described below. Note that the associative memory system including associative address controller 48 and associative memory 50 goes unused.

It will be appreciated that the above-described scenario is roughly equivalent to the spin loop operation shown in FIG. 5 wherein the expected semaphore data is found on the first read of the memory location. Thus, the substantial advantages provided by the present invention are not immediately apparent from this scenario.

SCENARIO 2: A STORED AND RE-EXECUTED CAN

This scenario is initiated in a manner identical to scenario 1 above. That is, the functions shown in FIG. 6A are performed identically, as are the "READ MEMORY LOCATION" and "TRANSMIT FIRST READ DATA TO PE" functions of FIG. 6B. However, in the present scenario the DATA READ does not compare with the DATA WRITE, and the "COMPARE WITH COMPARISON VALUE" test of FIG. 6B branches into the "NOT EQUAL" branch. Both the requesting processing element 12 and control logic 52 will recognize that there is no match, the former from doing a compare on the returned DATA_READ signal, the latter from the signal generated at the output of comparator 32. The requesting processing element 12 may then chose to wait, or to switch to an alternate task (FIG. 6C). In either case, the requesting processing element 12 does not enter a spin loop as did the processing elements in the prior art described with respect to FIG. 5.

Sensing that there was no match, control logic 52 directs associative address controller 48 to store the processing element/task identification (PID_REQ), the selected memory location address (ADDRESS), the comparison value (DATA_WRITE), and the sum of TIMEOUT plus MASTER TIME CLOCK (i.e. the EXPIRATION TIME signal at the output of adder 44) in an address of associative memory 50 via data inputs D4, D1, D2, D3, respectively (step 616). In a manner conventional to the operation of associative memory systems, the address in memory 50 selected for storing the CAN directive is associative with the selected memory location address (ADDRESS) of main memory 46. This operation of an associative memory system will be well understood by those skilled in the art, and permits associative memory 50 to be substantially smaller than main memory 46. The EXPIRATION TIME signal, generated by adder 44, comprises a subsequent time at which the CAN directive will be automatically terminated.

In accordance with the present invention, each time the contents of main memory 46 are altered (step 618), for example through a LOAD operation, the contents of associative memory 50 are examined (step 620), and if a CAN directive is found having a stored address value matching that of the altered memory location (step 622), the CAN directive is automatically executed as a primitive operation. Assuming then that a memory location in main memory 46 has been altered, control logic 52 directs the reading of associative memory 50 and the comparison of all addresses stored in the CAN directives with the current ADDRESS signal indicating the altered memory content location. This comparison is performed in comparator 30, the comparator receiving the CAN directive addresses from output 01 of associative memory 50 and the current ADDRESS signal directly off of the signal line.

If a CAN directive is found containing a memory location address matching that of the current ADDRESS signal, the comparison value stored with the CAN directive is read out of associative memory 50 on output 02 and compared to the contents of the altered memory location in main memory 46 (i.e. the value of the DATA_WRITE signal). This comparison is performed in comparator 34. Assuming first that the values don't compare, then no action is taken with respect to the requesting processing element. It will be appreciated that these compares are automatically executed each time a location in main memory 46 is altered, without requiring any action or memory access from the requesting processing elements 12 which originally generated the CAN directives.

Assume now that the last described compare in comparator 34 yields a match, i.e. that the comparison value stored with the CAN directive in associative memory 50 matches the value of the DATA_WRITE signal. In this circumstance, the PID_REQ signal (which has been read, concurrently with the comparison value of the CAN directive, on output 04 of the associative memory) is gated to the output of mux 40. The PID_REQ signal is used to return the current value of the updated location in main memory 46 to the requesting processing element 12 (step 626). The value is returned, of course, using the appropriate electronic handshaking as described above. It will be appreciated that this returned value, gated as the DATA$_{13}$ READ signal to the output of mux 36, can be provided either from the DATA_WRITE signal or the actual data read at the O of main memory 46, both being equal. The requesting processing element 12, upon receiving the returned value, either releases from a wait state or processes the returned data via a conventional interrupt mechanism. Subsequently, when the requesting task is reactivated, (step 628 of FIG. 6C), it does it's own compare to determine that the comparison value has been matched and hence the condition has been met. Again, it is important to note that all of the above executions of the CAN directive stored in associative memory 50 have occurred without any memory accesses or other action on the part of the requesting processing element 12.

Describing now the utilization of the TIMEOUT data provided with the CAN directive, this data is first used to provide the EXPIRATION TIME value in the manner described above. This EXPIRATION TIME value is stored with the CAN directive in associative memory 50. Subsequently, during cycles of system 10 wherein the contents of main memory 46 are not altered, control logic 52 functions to read the stored CAN directives from associative memory 50 and compare the stored EXPIRATION TIME data with the MASTER TIME CLOCK data at comparator 36 (step 630). These operations are shown in FIG. 6B at the "NO" branch of the "MAIN MEMORY LOCATION UPDATE" test. When the EXPIRATION TIME for a given CAN has been exceeded, the address stored with that CAN is gated through mux 42 to read the current value of the selected main memory location. This current value is gated as the DATA_READ signal to the output of mux 38. Generally concurrently, the identification of the requesting processing element 12, PID_REQ, is gated from associative memory 50 to the output of mux 40. The PID_REQ signal is then used to return the DATA_READ signal to the requesting processing element 12 (step 632), using, of course, the appropriate electronic handshaking described above. The requesting processing element 12 then does its own compare (step 608 of FIG. 6C) between the value returned from memory element 14 and its own comparison value, and determines that there is no match. The requesting processing element 12 can then enter an error recovery state (not shown). The CAN directive is subsequently terminated (step 634) by erasing it from associative memory 50 so that it is not subsequently read or executed. It will be appreciated that the above-described timeout of the CAN directive was executed with no memory access or other action on the part of the requesting processing element 12.

Several features of the present invention will become apparent from a consideration of the above. First, while the operation of parallel processing system 10 has been generally described with respect to the generation and execution of a single CAN directive, it will be appreciated that many CAN directives can be stored in associative memory 50 and executed by memory element 14. These CAN directives can originate from the same or different processing elements 12, and more than one CAN directive can be directed to the same selected memory location in main memory 46. Such would be the case, for example, when multiple child tasks being performed in different processing elements 12 are all waiting on a particular semaphore to arrive at the same memory location. For memory element 14 to function in the manner described above, it may be desirable for the memory element to operate at an internal clock rate faster than that of the main system clock for parallel processing system 10. Such a speed increase would, of course, be determined by the size of associative memory 50 and the number of CAN directives storable there.

Figure 7A:
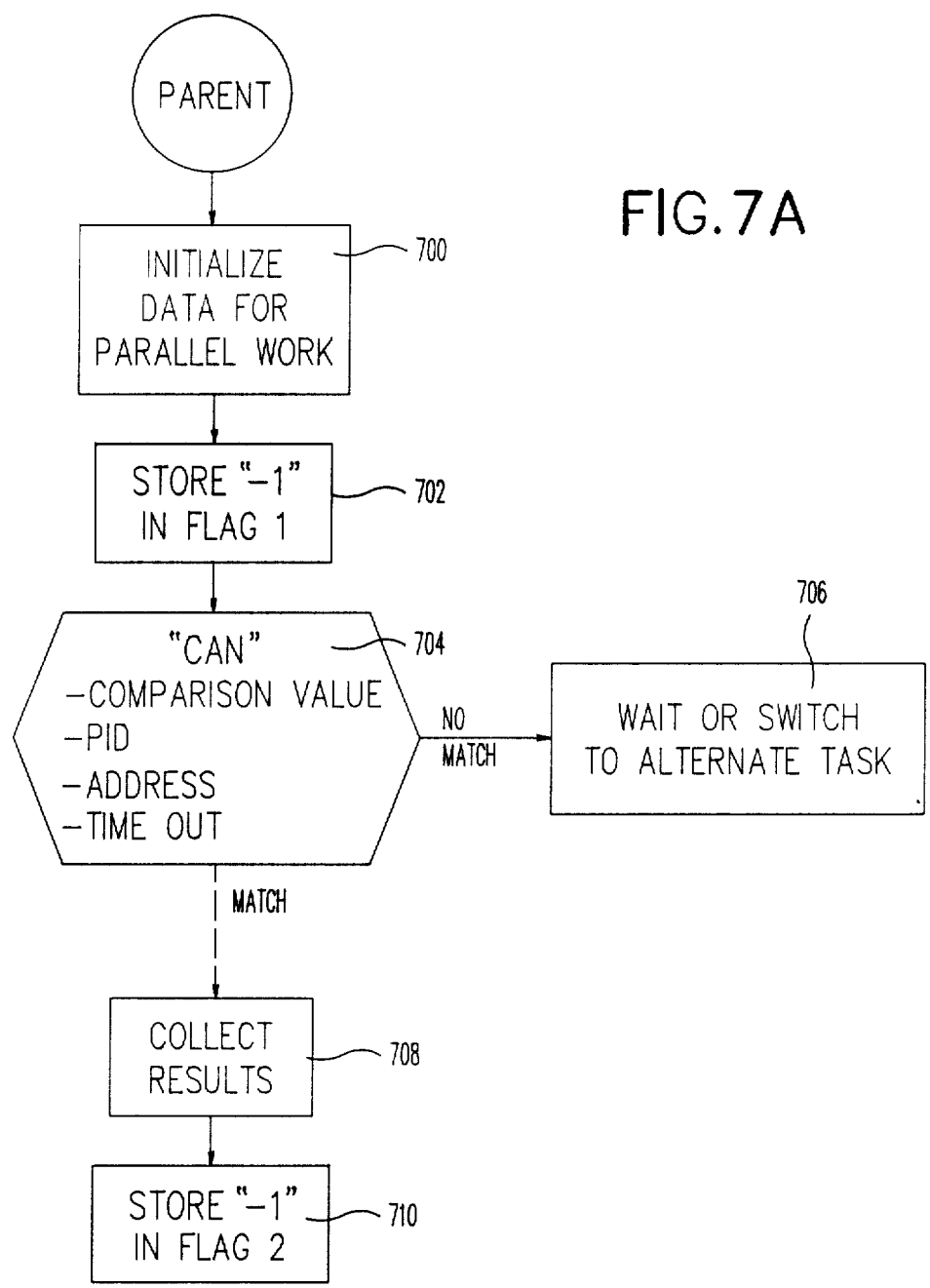
FIGS. 7A, 7B comprise flow charts showing a simplified example of parallel processes running on the system of FIG. 1 and utilizing Compare And Notify directives in accordance with the present invention.
Figure 7B:
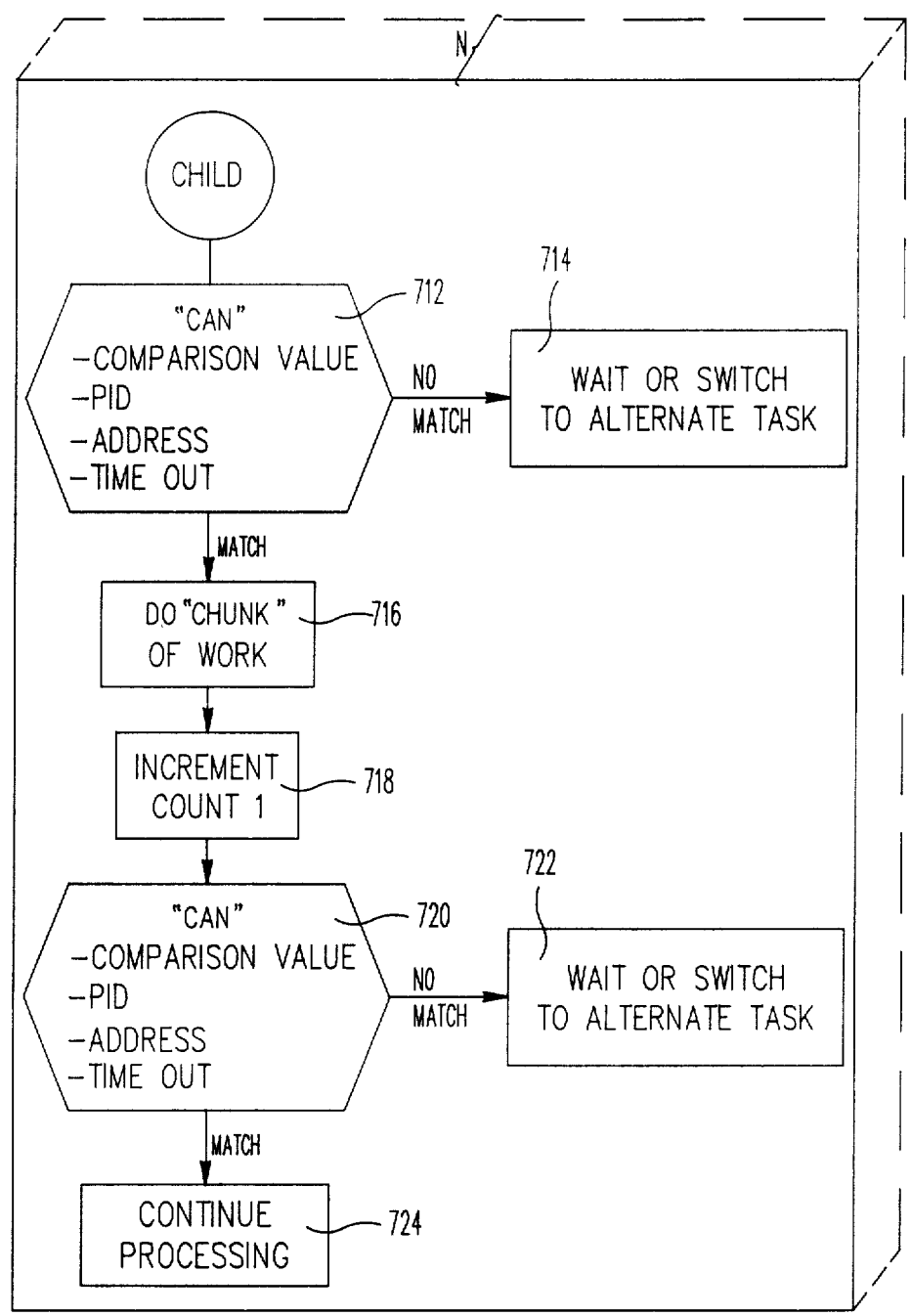

Referring now to FIGS. 7A, 7B a simple FORK-/JOIN operation is shown including a parent task at 7A and a plurality N of child tasks at 7B. This FORK-/JOIN operation is similar to that shown and described with respect to FIG. 5 above, excepting that the process is shown now using the CAN directive of the subject invention.

Referring first to FIG. 7A, the processing element 12 running the parent task initializes data required to run the child tasks (step 700), and then stores a count of "−1" at the shared memory location FLAG1 (step 702). The processing element 12 then generates a CAN directive to determine when all of the child tasks are complete (step 704). This CAN directive includes a comparison value equal to the number of child tasks, the identification of the requesting processing element 12 (and that of the task if appropriate), the address of FLAG1 to be monitored, and a TIMEOUT value determined by the particular process being run. If the CAN directive is not immediately successful, i.e. the compare value and the count in the FLAG1 address do not match, then the requesting processing element 12 can enter a wait state or switch to an alternate task (step 706). If the requesting processing element 12 is subsequently interrupted with returned data indicating a match, it can collect the results (step 708) generated by the child tasks and enter a count "−1" in FLAG2 (step 710) indicating the same to the child tasks. If the requesting processing element is subsequently interrupted with returned data indicating that a timeout has occurred, it can enter a failure recovery routine (not shown). It is important to note that, regardless of the result brought about by the CAN directive, in accordance with a main advantage of the present invention, no spin loops are required.

Examining now the child tasks shown in FIG. 7B, as each task is first initiated, its processing element 12 generates a CAN directive (step 712) to determine if the necessary data has been initialized. This CAN directive includes a compare value equal to "−1" (the semaphore generated by the parent task when the data is initialized), the requesting processing element 12 identification (and task identification as required), the address of FLAG1, and a TIMEOUT value determined by the process. If the data returned as a result of the first execution of the CAN directive indicates there is no match between the comparison value and the data stored at FLAG1, the requesting processing element, 12 can enter a wait state or switch to an alternate task (step 714). If data is subsequently returned (as a result of a subsequent execution of the CAN directive in selected memory element 14) indicating a timeout, the requesting processing element 12 can enter an error recovery mode (not shown). If data is subsequently returned (again as a result of a subsequent execution of the CAN directive in selected memory element 14) indicating a match between the comparison value and the data stored at FLAG1, the requesting processing element 12 can continue to perform, its "chunk" of work (step 716), incrementing the count1 at FLAG1 (step 718) when it is finished.

Subsequent to the completion of its program, the processing element 12 running each child task generates a second CAN directive (step 720) to determine if the data generated by that child task has been collected by the parent task. This CAN directive includes a comparison value of "−1", a requesting processing element identification (and a task identification where appropriate), the address of FLAG2, and a TIMEOUT value determined by the process. If data returned to the requesting processing element 12 as a function of the first execution of the CAN directive indicates that there is no match between the comparison value and the value stored at FLAG1, the requesting processing element 12 can enter a wait state or switch to an alternate task (step 722). If data is subsequently returned (as a function of a subsequent execution of the CAN directive in selected memory element 14) indicating that a timeout has occurred, the requesting processing element 12 can initiate an error recovery process (not shown). If data is subsequently returned (as a function of a subsequent execution of the CAN directive in selected processing element 14) indicating a match between the comparison value and the value stored at the FLAG2 memory location, the requesting processing element 12 can continue on to the next task (step 724).

It will thus be appreciated that, in contrast to the FORK/JOIN process described with respect to FIG. 5 above, when parallel processing system 10 is operated in accordance with the present invention, at no time are the parent or child tasks illustrated in FIG. 7 required to enter a spin loop. The present invention does, in fact, obviate the vast majority of the spin loops used in the prior art. Thus, in the parallel processing system 10 constructed and operated in accordance with the present invention, a substantially decreased number of memory location accesses are required. This decrease in the required number of memory location accesses functions to directly decrease the usage of interconnection network 16. The decreased usage of interconnection network 16 reduces the number of contentions or interferences on the network, substantially eliminating the formation of "hot spots".

In accordance with another embodiment of the present invention, under some operating conditions it is desirable for a processing element 12 to monitor the contents of a selected memory location, regardless of whether those contents match a comparison value. In such circumstances, the present invention is utilized to have the processing element 12 send a directive to the selected memory element, the directive including the memory location and an identification of the requesting processing element (and task, if appropriate). The selected memory element 14 then operates on the directive to return read data whenever a selected memory location is altered, regardless of whether such read data matches a comparison value. It will be appreciated that the construction and operation of this embodiment of the invention is substantially identical to that described above, excepting for the omission of the comparison data, the compare step, and of course, the hardware in which the compare is performed. Such operation would, of course, negate the requirement for a spin loop initiated by the requesting processing element 12 to periodically read the memory location, thereby providing the above-described advantages.

In accordance with yet another embodiment of the present invention, the CAN directives are beneficially utilized in a uniprocessor processing system. Such a uniprocessor system is substantially identical to that described above with respect to FIGS. 1, 2, 3, and 4, above, with the exception that only a single processing element 12 and memory element 14 are provided, the pair being connected by an appropriate bus-type interconnection network 16. The operation of such a uniprocessor system is likewise substantially identical to that shown and described with respect to FIGS. 6 and 7 above, excepting that each CAN directive must include a task identification, the various tasks being executed serially on the single processing element 12 (vs. in parallel on multiple processing elements as shown in FIGS. 7A, 7B).

When utilized in a uniprocessor system, the single processing element 12 is relieved of the polling chore necessary to monitor semaphores so as to synchronize multiple sequential tasks in the manner described above. Instead, in accordance with the present invention, the status of the semaphores in memory element 14 are monitored using the CAN directive. Processing element 12 is thus freed to perform data processing.

There is thus provided a new and improved method and apparatus for communicating data between multiple tasks in processing systems through the use of memory directives operative to monitor the status of a semaphore at a memory location provided by a requesting processor. When utilized in a multiprocessor/parallel processing system, the present invention provides for the communication of data between a plurality of processing elements, through semaphores stored in a plurality of memory elements, without repetitious accessing of those memory elements over an interconnection network. The present invention thus substantially reduces hot spots otherwise formed within the interconnection network, increasing the speed and efficiency of the parallel processing system. Fine grain parallelism is thus accommodated in large scale parallel processing systems. When utilized in a uniprocessor environment, the present invention provides for the communication of data between multiple tasks without high overhead polling by the processing element. The processing element is thus freed to more efficiently process data.

While the present invention has been described with respect to a preferred embodiment, numerous modifications, changes and improvements will occur to those skilled in the are without departing from the spirit and scope of the present invention.

What is claimed is:

1. In a data processing system including a plurality of processing elements interconnected with each other and with at least one memory element by an interconnection means, each of said processing elements selectively executing program tasks, said at least one memory element including multiple memory locations identifiable by corresponding memory addresses for storing data, a method for synchronizing operation of said plurality of processing elements, said method comprising the steps of:
designating a selected memory location of a selected memory element to contain semaphore data;
altering, by selected ones of said plurality of processing elements, said semaphore data whereby to indicate a status of selected tasks;
sending, from at least one requesting processing element to said selected memory element via said interconnecting means, a directive including
(1) the address of said selected memory location, and
(2) an identification of the requesting processing element sending said directive;
reading in said selected memory element said semaphore data;
sending said semaphore data to said requesting processing element via said interconnection means;
storing said directive in said memory element;
monitoring in said memory element the alteration of said semaphore data; and
repeating said reading and sending steps when said semaphore data is altered.

2. A method in accordance with claim 1 wherein said step of sending said directive further includes sending a timeout value; and
terminating said repeating step when said timeout value is exceeded.

3. A method in accordance with claim 1 wherein said sending step includes the step of assembling said directive in said requesting processing element.

4. A method in accordance with claim 1 wherein said storing step includes storing said directive associatively with the address of said selected memory location.

5. A method in accordance with claim 1 wherein said sending step includes sending a task identification of a requesting task performed by said requesting processing element.

6. In a data processing system including a plurality of processing elements interconnected with each other and with at least one memory element by an interconnection means, each of said processing elements selectively executing program tasks, said at least one memory element including multiple memory locations identifiable by corresponding memory addresses for storing data, a method for synchronizing operation of said plurality of processing elements, said method comprising the steps of:
designating a selected memory location of a selected memory element to contain semaphore data;
altering, by selected ones of said plurality of processing elements, said semaphore data whereby to indicate a status of selected tasks;
sending, from at least one requesting processing element to said selected memory element via said interconnecting means, a directive including
(1) the address of said selected memory location,
(2) a comparison value, and
(3) an identification of the requesting processing element sending said directive;
reading in said selected memory element said semaphore data;
comparing in said memory element said semaphore data with said comparison value;
notifying said requesting processing element via said interconnection means if said semaphore data matches said comparison value;
storing said directive in said selected memory element if said semaphore data does not match said comparison value;
monitoring in said selected memory element the altering of said semaphore data; and
repeating said reading, comparing, and notifying steps when said semaphore data is altered.

7. A method in accordance with claim 6 and further including the step of returning said semaphore data obtained by the first one of said reading steps to said requesting processing element regardless of whether said semaphore data matches said comparison value.

8. A method in accordance with claim 7 wherein said step of sending a directive to said selected memory element further includes the step of sending a timeout value to said memory element; and terminating said repeating step when said timeout value is exceeded.

9. A method in accordance with claim 7 wherein said step of notifying said requesting processing element includes sending said semaphore data read in said reading step to said requesting processing element.

10. A method in accordance with claim 7 and further including the step of assembling said directive in said requesting processing element.

11. A method in accordance with claim 7 wherein said storing step includes the step of storing said directive associatively with the address of said selected memory location.

12. A method in accordance with claim 7 wherein said step of sending said directive includes sending an identification of a requesting task performed by said requesting processing element.

13. In a data processing system including a plurality of processing elements interconnected with each other and with at least one memory element by an interconnection means, each of said processing elements selectively executing program tasks, said at least one memory element including multiple memory locations identifiable by corresponding memory addresses for storing data, apparatus for synchronizing operation of said plurality of processing elements, comprising;
means for designating a selected memory location of a selected memory element to contain semaphore data;
means for altering, by selected ones of said plurality of processing elements, said semaphore data whereby to indicate a status of selected tasks;
means for sending, from at least one requesting processing element to said selected memory element via said interconnecting means, a directive including
(1) the address of said selected memory location, and
(2) an identification of the requesting processing element sending said directive;
means for reading in said selected memory element said semaphore data;
means for ending said semaphore data to said requesting processing element via said interconnection means;
means for storing said directive in said memory element;
means for monitoring in said memory element the altering of said semaphore data; and
means for activating said reading and sending means when said semaphore data is altered.

14. Apparatus in accordance with claim 41 wherein said directive further includes a timeout value; and means for terminating said activating means when said timeout value is exceeded.

15. Apparatus in accordance with claim 41 wherein said means for sending said directive includes means for assembling said directive in said requesting processing element.

16. Apparatus in accordance with claim 13 wherein said storing means includes means for storing said directive associatively with the address of said selected memory location.

17. Apparatus in accordance with claim 13 wherein said sending means includes means for sending a task identification of a requesting task performed by said requesting processing element.

18. In a data processing system including a plurality of processing elements interconnected with each other and with at least one memory element by an interconnection means, each of said processing elements selectively executing program tasks, said at least one memory element including multiple memory locations identifiable by corresponding memory addresses for storing data, apparatus for synchronizing operation of said plurality of processing elements, comprising:
means for designating a selected memory location of a selected memory element to contain semaphore data;
means for altering, by selected ones of said plurality of processing elements, said semaphore data whereby to indicate a status of selected tasks;
means for sending, from said at least one requesting processing element to said selected memory element via said interconnecting means, a directive including
(1) the address of said selected memory location,
(2) a comparison value, and
(3) an identification of the requesting processing element sending said directive;
means for reading in said selected memory element said semaphore data;
means for comparing in said memory element said semaphore data with said comparison value;
means for notifying said requesting processing element via said interconnection means if said semaphore data matches said comparison value;
means for storing said directive in said selected memory element if said semaphore data does not match said comparison value;
means for monitoring in said memory element the altering of said semaphore data; and
means for activating said reading, comparing, and notifying means when said semaphore data is altered.

19. Apparatus in accordance with claim 18 and further including means for returning the first read semaphore data to said requesting processing element regardless of whether the first read semaphore data matches said comparison value.

20. Apparatus in accordance with claim 18 wherein said directive includes a timeout value; and further including
means for terminating said activating means when said timeout value is exceeded.

21. Apparatus in accordance with claim 18 wherein said means for notifying said requesting processing element includes means for sending said semaphore data to said requesting processing element.

22. Apparatus in accordance with claim 18 and further including means for assembling said directive in said requesting processing element.

23. Apparatus in accordance with claim 18 wherein said storing means includes means for storing said directive associatively with the address of said selected memory location.

24. Apparatus in accordance with claim 18 wherein said directive includes an identification of a requesting task performed by said requesting processing element.

* * * * *